(12) United States Patent
Byrnes et al.

(10) Patent No.: US 7,689,526 B2
(45) Date of Patent: Mar. 30, 2010

(54) KNOWLEDGE BASE WITH CLUSTERED DATA OBJECTS

(75) Inventors: John Byrnes, Poway, CA (US); Richard Rohwer, San Diego, CA (US)

(73) Assignee: Fair Isaac Corporation, Minneapolis, MN (US)

(*) Notice: Subject to any disclaimer, the term of this patent is extended or adjusted under 35 U.S.C. 154(b) by 542 days.

(21) Appl. No.: 11/698,608

(22) Filed: Jan. 25, 2007

(65) Prior Publication Data

US 2008/0183653 A1 Jul. 31, 2008

(51) Int. Cl.
*G06F 17/00* (2006.01)
*G06N 5/00* (2006.01)
(52) U.S. Cl. .................................. 706/45
(58) Field of Classification Search ............... 706/45
See application file for complete search history.

(56) References Cited

U.S. PATENT DOCUMENTS 6,205,446 B1* 3/2001 Mittal et al. ............. 707/101
6,480,859 B2* 11/2002 Mittal et al. ............. 707/101
2006/0117067 A1* 6/2006 Wright et al. ........... 707/104.1
2008/0114785 A1* 5/2008 Bernstein et al. ........ 707/100

OTHER PUBLICATIONS

Compiling conceptual graphs, Ellis, G.; Knowledge and Data Engineering, IEEE Transactions on vol. 7, Issue 1, Feb. 1995 pp. 68-81 Digital Object Identifier 10.1109/69.368517.*

* cited by examiner

*Primary Examiner*—Michael B Holmes
(74) *Attorney, Agent, or Firm*—Mintz, Levin, Cohn, Ferris, Glovsky and Popeo, P.C.

(57) ABSTRACT

A knowledge base is first characterized by an association-grounded semantics collapsed language. In response to the receipt of a query of the knowledge base, the collapsed language is used to determine whether there is an indication that the knowledge base contains knowledge requested in the query. Thereafter, the collapsed language can be used to carry out a full search for the knowledge much more efficiently than would otherwise be possible. Related methods, apparatus, and articles are also described.

20 Claims, 6 Drawing Sheets

KNOWLEDGE BASE WITH CLUSTERED DATA OBJECTS

TECHNICAL FIELD

The subject matter described herein relates to a knowledge base (also referred to as a knowledge representation and reasoning system) with clustered data objects (such as symbols).

BACKGROUND

Knowledge representation and reasoning systems embody intelligent processes that characterize stored knowledge and which can state in a formal way that the existence of some piece of knowledge implies the existence of some other, previously unknown piece of knowledge. Optimizing engines to conduct such processes requires that a number of states searched by such engines in determining the existence of a piece of knowledge is minimized. Conventional optimization techniques often rely heavily on human-input or the characterization of special cases, both of which can be difficult to extend and further optimize.

SUMMARY

In one aspect, a query of a knowledge base is received. The knowledge base comprises a plurality of logical symbols compressed into a plurality of disjoint bins. Thereafter, the plurality of bins are reasoned over to determine whether the bins indicate that the knowledge base contains knowledge requested in the query. After such reasoning, an indication is provided that characterizes a likelihood whether the knowledge base contains the knowledge requested in the query.

The symbols can be allocated to the bins by using association statistics (e.g., Kullback-Leibler divergence measures, Hellinger divergence measures, etc.) to map the symbols to points in an information geometric space and to assign near points to the same bin. The association statistics can assign probability distributions for each symbol over grounding features condition on observing the symbol. The probability distributions can be used to map the symbols to the points in the information geometric space.

The reasoning can include generating a candidate response to the query, and searching symbols within the information geometric space in a ranking based on proximate distance from a point in the information geometric space corresponding to the candidate response.

The query can, in some variations, include multiple sub-queries. In such cases, the reasoning can include generating a candidate response for each sub-query, determining a degree of clustering of symbols associated with each sub-query, and searching symbols within the information geometric space for the sub-query having the highest degree of clustering of symbols prior to searching symbols within the information geometric space for the other sub-queries.

The reasoning can comprise substituting variables in the query with variables associated with the plurality of bins.

In some implementations, at least a portion of the symbols can be reasoned over if it is determined that the bins indicate that the knowledge base contains knowledge requested in the query. Only those bins in which it is indicated that the knowledge based contains knowledge requested in the query can be reasoned over and/or the portion of the symbols reasoned over can be specified by a plan.

In an interrelated aspect, a query of a knowledge base characterized by an association-grounded semantics collapsed language is received. Afterwards, it is determined whether there is an indication that the knowledge base contains knowledge requested in the query so that an indication characterizing a likelihood whether the knowledge base contains the knowledge requested in the query can be provided.

In a further interrelated aspect, two or more knowledge bases can be merged by applying association-grounded semantics to collapse a language of each of the knowledge bases to obtain a single class of predicates for each language, and mapping the classes of predicates for the knowledge bases into a common language to generate a merged knowledge base.

The merged knowledge bases can comprise a shared grounding space having a number of common constants above a predetermined statistical threshold. In some cases at least two of the languages are disjoint so that the mapping identifies an isomorphism between graphs of the knowledge bases that represent assertions of the knowledge bases.

The mapping can additionally or alternatively include iteratively partitioning the knowledge bases into finer partitions using association-grounded semantics until a pre-determined scale is obtained.

Similar classes of predicated can be identified in each of the knowledge bases to facilitate merging. If at least one of the knowledge bases includes natural language descriptions of its utilized symbols, text processing can be applied to obtain association-grounded semantic meanings for each of the utilized symbols.

In yet a further interrelated aspect, a knowledge base which included a plurality of logical symbols arranged in formulas can be received. Thereafter, a probability distribution can be assigned to each of at least a portion of the symbols. The symbols can then be placed into bins based on a similarity of the assigned probability distributions. Access can then be provided to a compressed knowledge base in which the bins are used as a reduced set of symbols to enable one or more queries to be performed against the knowledge base.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
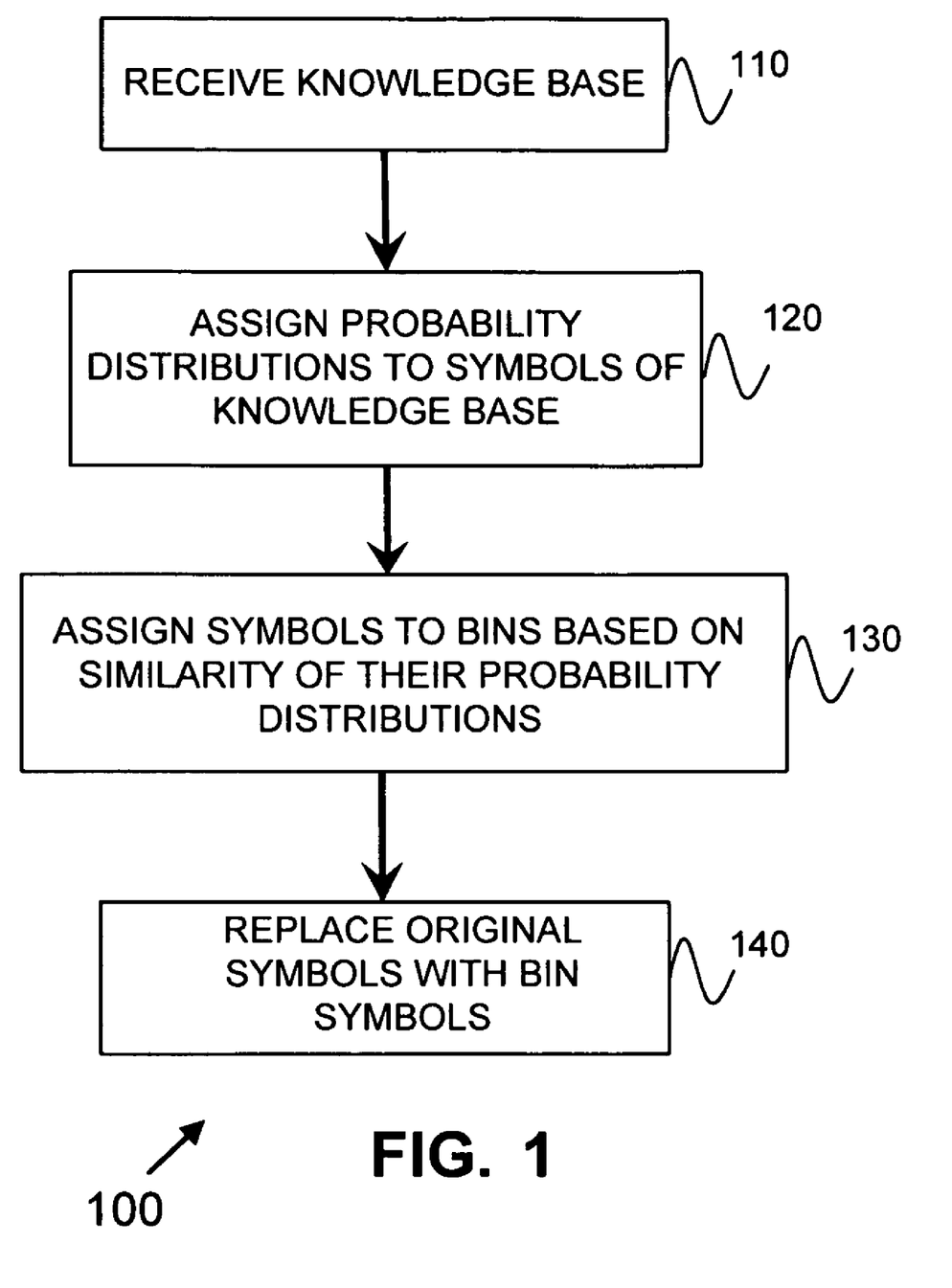
FIG. 1 is a process flow diagram illustrating a technique for compressing a knowledge base.

FIG. 1 is a process flow diagram illustrating a method 100, in which, at 110, a knowledge base is received. The knowledge base comprises a plurality of logical symbols arranged in formulas. At 120, a probability distribution is assigned to each symbol representing its distribution over some fixed set of contexts. At 130, the symbols are placed into bins based on the similarity of their assigned distributions. At 140, the resulting bins are used as new symbols to create a new knowledge base. This derived knowledge base can be simplified by removing tautological and redundant formulas and subformulas, resulting in a compressed knowledge base.

Figure 2:
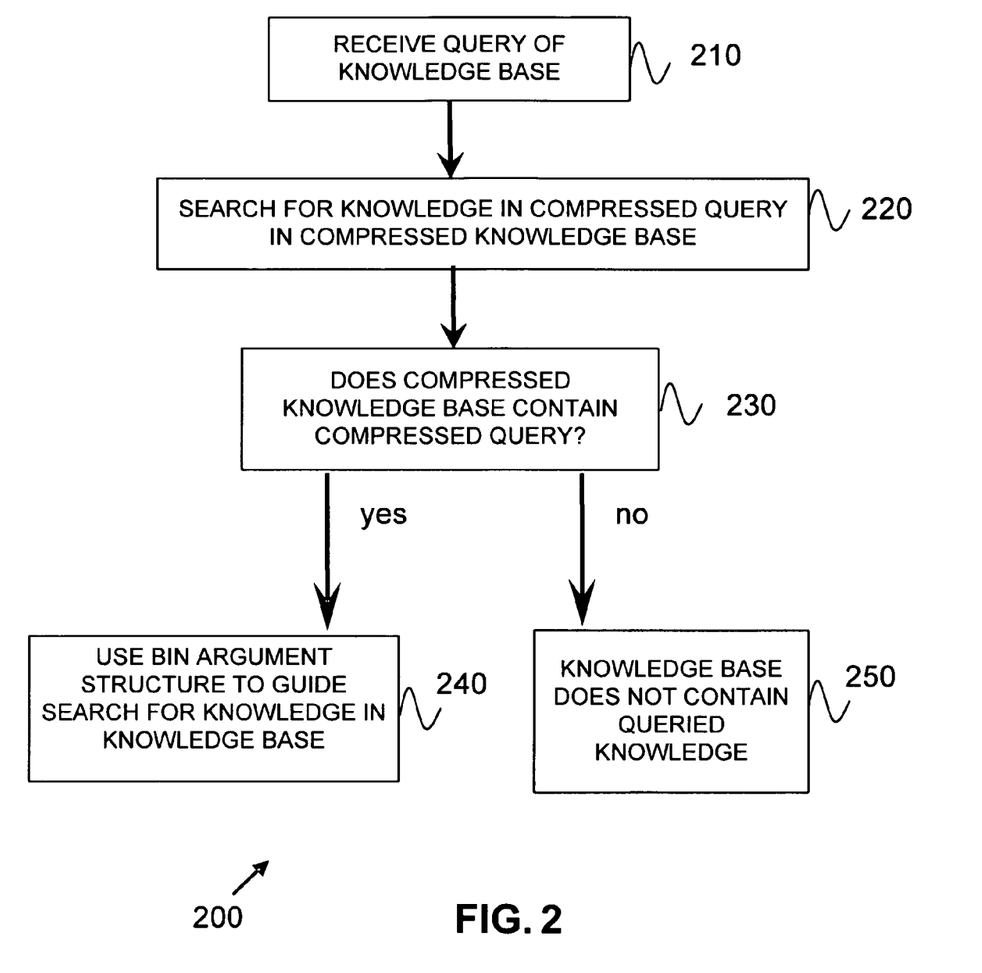
FIG. 2 is a process flow diagram illustrating a technique for determining whether queried knowledge is contained within a knowledge base.

FIG. 2 is a process flow diagram illustrating a method 200, in which, at 210, a query of a knowledge base is received. Thereafter, at 220, the plurality of bins are reasoned over to determine whether the bins indicate that the knowledge base contains knowledge requested in the query so that, at 230, an indication characterizing a likelihood whether the knowledge base contains the knowledge requested in the query can be provided. Optionally, if it is found, at 250, that the compressed knowledge base does not contain the knowledge requested by the compressed query, then it can be determined that the original knowledge base does not contain the knowledge requested by the original query. If the compressed knowledge base does contain an argument for the compressed query, then, at 240, this argument can be used to guide search for knowledge answering the original query in the original knowledge base.

The subject matter described herein expands the breadth of reasoning by tightly integrating statistical learning techniques with formal logic. The current approach is based on the development of models which capture the relative meanings of constants and predicates in a knowledge base. These models partition the knowledge base, so that approximate and deductive reasoning can take place. The partitions condense the knowledge space in multiple ways, allowing an application of novel proof planning techniques and enabling automated, robust knowledge base merging.

Two aspects for statistical learning melding with formal logic are described, both of which (especially in combination) address issues associated with robustness and scalability. The first aspect exploits information theory to capture semantic properties of the formal predicate and constant symbols, enriching the semantic universe in which the symbols are interpreted. The second aspect is the application of statistical clustering, which reduces the number of symbols in a language resulting in compression of a knowledge base. By exploiting advantages of a statistical approach, performance levels can be achieved that are not possible through purely logical means.

The subject matter described herein utilizes association-grounded semantics (AGS), which uses association statistics to map symbols of the knowledge base to points in an information geometric space. In particular, AGS uses probability distributions to capture the intuition that the meaning of an entity is the totality of all the information associated with it, which is based, in part, on information retrieval techniques that assign meanings to unstructured data such as text (see, for example, Byrnes and Rohwer (2005). "Text Modeling for Real-Time Document Categorization", in 2005 *IEEE Aerospace Conference Proceedings*, Big Sky, MT, IEEE Pub. 05TH8788C, ISBN 0-7803-8870-4, IEEE, 2005, the contents of which are hereby incorporated by reference). As provided herein, AGS can capture meanings of more complex entities, such as compound words, phrases and larger strings of text. As AGS replaces symbols with probability distributions, one can compare meanings using information theory and information geometry thereby eliminating obstacles that can result from the strict meanings of symbols.

AGS can be characterized as an assignment which is meant to characterize a common-sense understanding of a symbol. It places the objects of a classical model-theoretic semantics into a high-dimensional space in such a way that proximity in the space reflects similarity between the objects of the model. This relationship provides a geometric sense to the approximate meanings of ideas. AGS provides a mechanism by which plausibility of a hypothesized property of an entity can be measured against other properties held by the entity and by entities.

Figure 3:
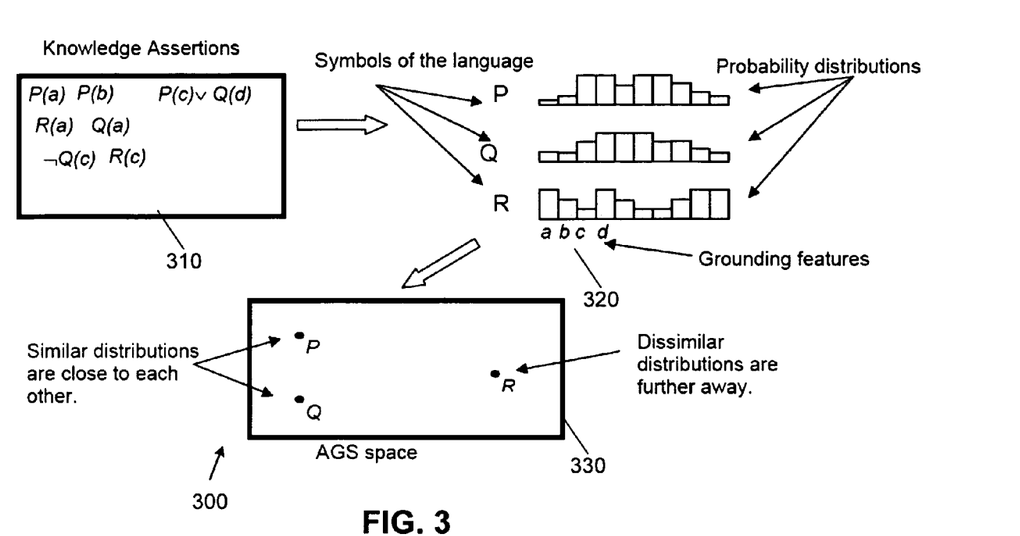
FIG. 3 is a diagram illustrating the construction of an association-grounded semantics model.

FIG. 3 is a diagram 300 that illustrates the construction of an AGS model. In order to construct an AGS model, a set of knowledge assertions 310 (formulas) to model are provided. These might be, for example, the entire contents of a given knowledge base. A set of structural contexts in which symbols might occur (the grounding features of the occurrences) are then selected. Each symbol is assigned a probability distribution 320 over grounding features conditional on observing the given symbol. These distributions 320, in turn, pick out points in a high-dimensional space 330. The distance between two points in this space is intended to indicate the amount of difference between the meanings of the symbols at those points. With such an arrangement, traditional logical semantics can be enriched by placing the objects at positions in an information geometric space in a meaningful way.

The approach is advantageous from a cognitive perspective because one's understanding of parts of the world has to do with associations among the parts. It is for this reason that the mapping from symbols to meanings can be characterized as a mental model. The probability distributions used to represent meanings are automatically obtained by counting, once the appropriate contexts are chosen. Information theory can then be applied for meaning comparison and categorization. Tools from statistical learning allow for a comparison of different choices of contexts, and the different meanings that result may be useful in different reasoning situations.

In one example with unary predicates and constants (similar techniques apply to other situations), a knowledge base containing a large number of constants $a_0, \ldots, a_n$ and a large number of unary predicates $P_0, \ldots, P_m$ is provided. Thereafter, a vector $v = \langle v_0, \ldots, v_m \rangle$ can be assigned to each individual constant $a_j$ where $v_i = 1$ if $P_i(a_j)$ appears in the knowledge base (asserting that entity $a_j$ has property $P_i$), $v_i = 0$ if $\neg P_i(a_j)$ appears (asserting that entity $a_j$ does not have property $P_i$), and $v_i = 0.5$ otherwise. By normalizing the vector so that the sum of its components is 1, a probability distribution is assigned to each individual constant $a_j$. The roles of constants and predicates can be reversed to do the same for the predicate symbols $P_i$. Formulas in the knowledge base can be used to shape this procedure: if we are given $(\forall x)(P_i(x) \rightarrow P_j(x))$ (asserting that all objects having property $P_i$ also have property $P_j$) then we can certainly count each $P_i$ observation as a $P_j$ observation as well.

If a query $?P_i(a_j)$ is provided and the knowledge base does not contain this assertion or its negation, probability distributions assigned to those constants for which $P_i$ is asserted can be used to apply information-theoretic distance measures to the distribution assigned to $a_j$ to get an initial belief score on the truth of $P_i(a_j)$. Predicates which lie closest to $P_i$ can be examined so that it can be tested whether $a_j$ holds for many of them, or measured how close $a_j$ lies to the individuals that this large ensemble of predicates applies to. If the assertions are randomly generated, then the distributions are not likely to hold any meaning. However, if the individual constants refer to real-world entities and the predicate symbols refer to actual properties of these entities, similar entities will have similar properties. The result is soft (extralogical) inference.

In some cases, the full probability distributions described above may be inefficient when comparing terms if there are tens of thousands of unary predicates in the language. If the unary predicates are clustered into a few hundred bins, instead, and the probability distributions reflect the presence of each constant in the predicates of each given bin, then only a distribution over a few hundred dimensions would need to be represented. When the constants are also clustered, not only are the distribution representation of the predicates simplified, but the number of distance comparisons between constants can be reduced—based on the supposition that the closest constants are the ones in the same bin.

Co-clustering techniques can be utilized that simultaneously group possible values of two arbitrarily correlated random variables in such a way that the group-valued variables thus defined retain as much of the mutual information of the original variables as possible (see, Byrnes and Rohwer (2005)). With such algorithms, each of a pair of sets with minimal loss of mutually predictive information compress, by equivalencing members. Refinements provided herein can help improve semantic fidelity. Bayesian methods can be applied in a Multinomial-Dirichlet framework in order to estimate information accurately when the data exhibits sparseness (when there are zero-counts, in particular).

The above-described techniques allow for the quantification of "similarity" between predicate symbols and between constants, derived from the contexts throughout a knowledge base in which the symbols occur. In addition, clustering techniques, and co-clustering techniques in particular, allow for symbols to be partitioned into bins. In effect, the form of the semantics can be compressed while preserving as much of its information as possible.

In the previous example above, a score was produced which can indicate the provability of P(a) for a given predicate P and constant a. Suppose that it is requested, as in the diagram 400 of FIG. 4 (which illustrates sets of AGS placements of constant P 410, Q 420, R 430, and S 440), to find a term x such that P(x), Q(x) and R(x) hold. This request may be a direct query or it may arise as part of a search by the inference engine. Some conventional inference engines might attempt to prove P(a), Q(a), and R(a) for every a in the knowledge base. Other conventional inference engines might restrict the space significantly by looking at the relevant structure of available premises, however, there is often a large space left to search. Using the AGS semantics of the constants known to witness each predicate, a "prototypical" meaning for each predicate can be developed which represents the average constant for which the predicate is known to hold. Information geometry can then be used to generate a hypothetical prototype candidate 450 that satisfies P, Q, and R. The space of candidate terms can be ranked according to distance from this prototype. In doing so, the search space can be significantly reduced, and the correct term is likely to be chosen much earlier in the search.

Figure 4:
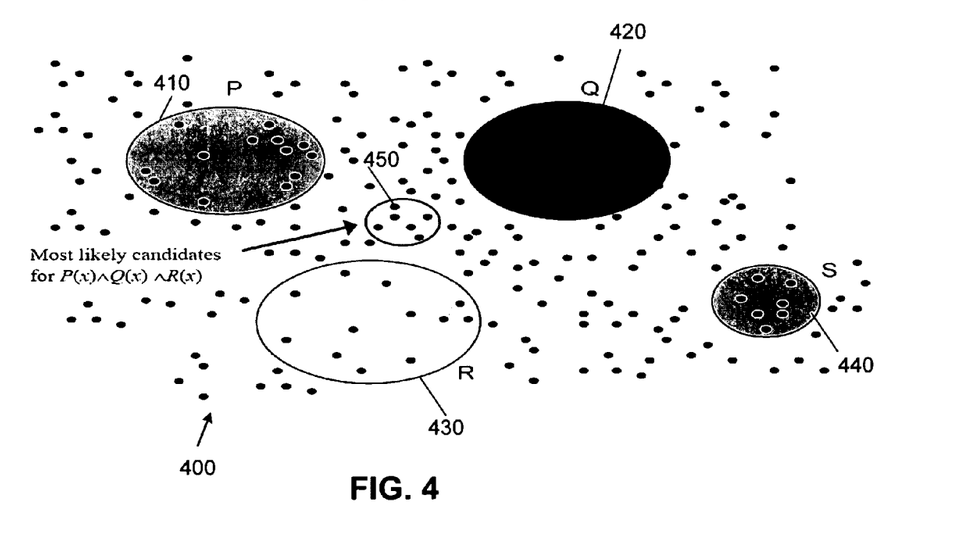
FIG. 4 is a schematic diagram illustrating a distribution of constants in an association-grounded semantics space to enable a ranking of candidate solutions for a given query.

The distribution of constants in AGS space can be used to rank candidate solutions for a given query. For instance, the constants in the prototype circle 450 in FIG. 4 are the most likely to satisfy P(x), Q(x) and R(x). Information geometry can likewise be used for smart proof planning, for instance, it will be harder to prove P(x) and S(x), than P(x), Q(x) and R(x). The combined impact on the search space greatly increases an amount of time to obtain a solution.

The information geometry of the query can also be used to estimate a difficulty of the solution. When the knowledge base is queried for an entity x that either satisfies P(x), Q(x), and R(x) or satisfies P(x) and S(x), a conventional inference engine only knows that one query includes three tasks and the other includes only two. However, when we examine AGS placements of each constant, the P set 410 and the S set 440 are each tightly clustered and distant from each other (as illustrated, at 330, in FIG. 3). But the R set 440 and Q set 430 lie closer to the P set 410 and are less tightly clustered. Hence, it can be concluded that P(x), Q(x) and R(x) is the easier query to prove.

In some implementations, unary predicates and constants can be extended to arbitrary formal systems. Techniques for dealing with Cartesian product spaces can be utilized to allow predicates of arbitrary parity to be dealt with similarly. Statistics associated with occurrences of symbols in structurally related positions of a premise can be taken. For example, one can count the number of occurrences of a given symbol with other symbols in which they both occur positively, both occur negatively, or occur one negatively and the other positively. This notion can also be applied in propositional logic.

Figure 5:
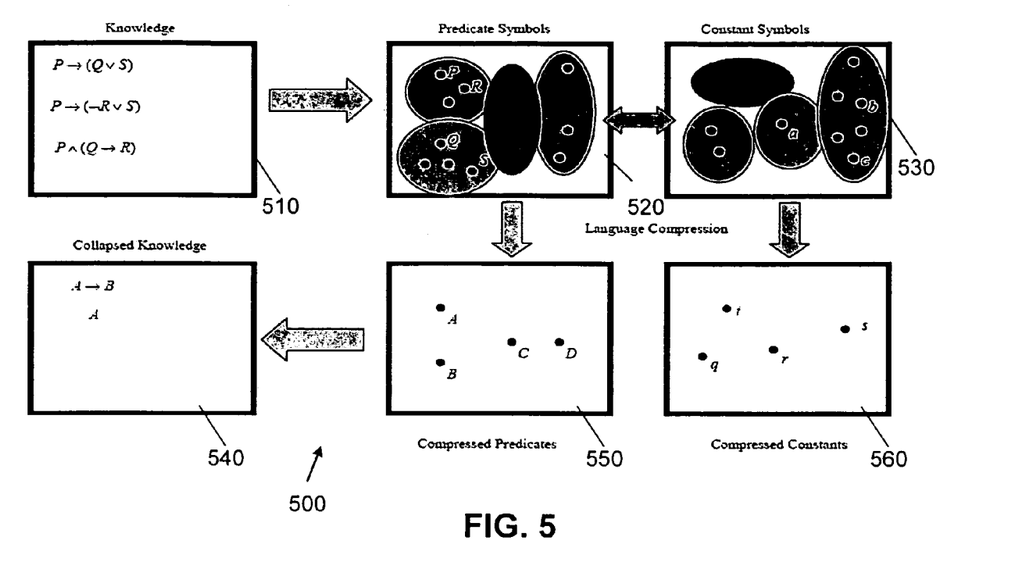
FIG. 5 is a diagram illustrating a technique for knowledge compression by means of association-grounded semantics.

For illustration purposes, and with reference to the diagram 500 of FIG. 5, consider a propositional knowledge base 510 containing tens of thousands of propositional variables and assertions. AGS semantics can be assigned to each variable by choosing grounding features that reflect the overall logical structure, so that variables with similar meanings play similar roles in the assertions. The variables can then be partitioned into a few hundred bins and a coarse-grained proof search can be performed over the space defined by the bins. The coarse-grained search works by replacing all variables $P_0, \ldots, P_n$ in the first bin by the single variable P, replacing all variables $Q_0, \ldots, Q_m$ of the second bin by the single variable Q, etc. If the new symbols are substituted into the query formula and all of the premises, a drastically reduced search space is achieved. Many assertions may become identical, and many may become tautological (such as P→P), and can be eliminated. Therefore, compression of the original knowledge can be achieved.

Partitioning the original language into bins compresses knowledge: individual predicates 520 and constants 530 are replaced with symbols 550, 560 for their bins. The collapsed space 540 is then used to construct proof plans.

Figure 6:
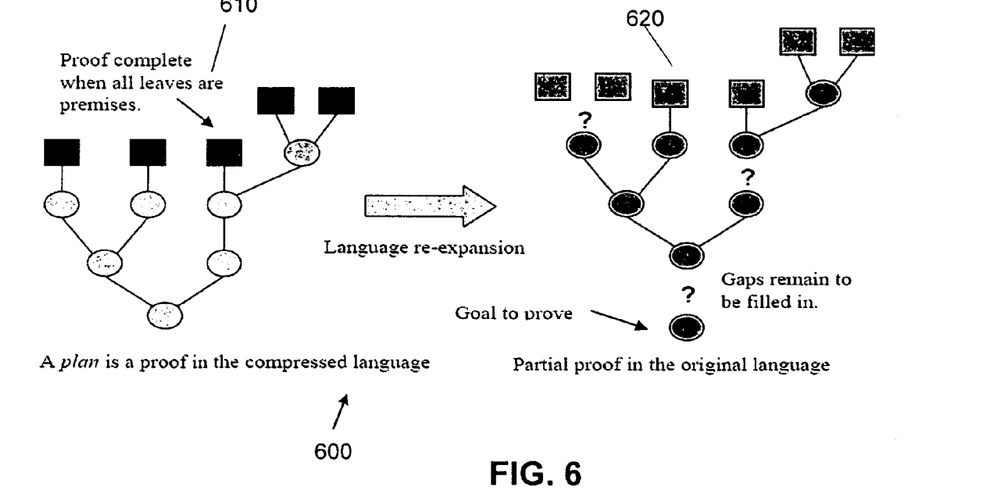
FIG. 6 is a diagram illustrating a completed plan in a compressed language and a partial proof in an original language.

With reference to the diagram 600 in FIG. 6, once there is a proof in the condensed space 610, the formulas can be expanded back into the original language 620. The result is a plan for finding a proof in the original space: it is the sequence of subproblems which comprise a proof if all subproblems are solved. Each subproblem can then be solved in the original search space. When there is a need to achieve higher degrees of compression, the bins of the first partition can be subdivided into smaller bins, resulting in a refinement of the original partition.

A completed plan in the compressed language defines a restricted set of subproblems (question marks) in the original language. Avoiding exhaustive proof search in this way can greatly enhance inference engine speed.

With reference to Table 1, a set of propositional premises is provided (see, Pelletier (1986). Seventy-five graduated problems for testing automatic theorem provers, *Journal of Automated Reasoning*, pp. 191-216). The language for this premise set is P, Q, R, S. In this example, one can choose negative and positive subformula occurrences for the AGS grounding features. Recall that A and B are said to be positive subformulas and C is said to be a negative subformula in all the following formulas:

$$A \wedge B, A \vee B, C \to B, \neg C.$$

Negative subformulas of positive subformulas are negative, negative subformulas of negative subformulas are positive, etc. Intuitively, the falsehood of negative subformulas and truth of positive subformulas both contribute to the truth of the overall formula. In Table 1, it is indicated for each of P, Q, R, S whether it occurs negatively or positively in each premise (in general, multiple occurrences are possible, but this does not arise in our example.)

TABLE 1

Positive and Negative Subformula Occurrences.

| Premises | P | Q | R | S |
|---|---|---|---|---|
| 1  $P \to (Q \vee S)$ | − | + |   | + |
| 2  $P \to (\neg R \vee S)$ | − |   | − | + |
| 3  $P \wedge (Q \to S)$ | + | − |   | + |

An AGS meaning can be created for each of the propositional variables and subformulas of the premises can be observed. Let X be a random variable ranging over observations of subformula occurrences, and C be a random variable corresponding the context of the observed occurrence. 1+ can be written for a positive subformulas of premise 1, etc. Thus, $P(C=1+|X=Q)$ is the probability that the observed subformula is a positive subformula of premise 1 given that the observed subformula is Q. This probability is ½, as recorded in the first column of Table 2.

Each propositional variable A can be assigned the vector of $$\langle P(C=1+|X=A), P(C=1-|X=A), P(C=2+|X=A),$$
$$P(C=2-|X=A), P(C=3+|X=A), P(C=3-|X=A) \rangle$$

As the set of contexts in the vector forms a partition of all possible contexts for given observation, the vector forms a probability distribution (specifically, distribution of contexts conditional on observed formula). Distributions are enumerated in Table 2.

TABLE 2

Probability Distribution Associated with Each Propositional Variable.

|   | 1+ | 1− | 2+ | 2− | 3+ | 3− |
|---|---|---|---|---|---|---|
| P | 0 | ⅓ | 0 | ⅓ | ⅓ | 0 |
| Q | ½ | 0 | 0 | 0 | 0 | ½ |
| R | 0 | 0 | 0 | 1 | 0 | 0 |
| S | ⅓ | 0 | ⅓ | 0 | ⅓ | 0 |

Next, the language can be partitioned in such a way that symbols having a similar probability distributions are close to each other in the space. A variety of similarity measures can be used, such as the Hellinger divergence which is utilized in the following:

$$D[f, g] = \sqrt{2\left(1 - \sum_{k} \sqrt{f(k)g(k)}\right)}$$

where f and g are discrete probability distributions over a shared event space and k ranges over that event space. Table 3 gives the Hellinger divergence for each pair of distributions. This divergence is symmetric, so the lower triangle of the table is omitted.

TABLE 3

Hellinger Distance between each Pair of Symbols in AGS Space.

|   | P | Q | R | S |
|---|---|---|---|---|
| P | 0 | 1.41 | 0.919 | 1.33 |
| Q |   | 0 | 1.41 | 1.09 |
| R |   |   | 0 | 1.41 |
| S |   |   |   | 0 |

As can be noted, P and R are closer to each other than either is to any other variable, and similarly for S and Q. Therefore, the space can be partitioned and the resulting partitions named as follows:

$$A=\{P,R\} \text{ and } B=\{Q,S\}.$$

This simple partition amounts to compression of the language. The knowledge is compressed by substituting the partition variables for the base language variables in the premises and then simplifying by means of algebraic equivalences (such as replacing $A \vee A$ by A, dropping instances of $A \to A$, etc.). The results are shown in Table 4. One quantitative measure of the complexity of a premise set is the size of its truth table. The truth table for the original three premises contains $2^4$ lines, each line requiring 7 Boolean operations, or 112 total operations. After simplification, there are two premises in two variables, so the truth table contains $2^2$ lines with one Boolean operation each, or 4 total operations.

TABLE 4

Compression of the Original Premise Set.

| Original | Substitution | Simplified |
|---|---|---|
| $P \to (Q \vee S)$ | $A \to (B \vee B)$ | $A \to B$ |
| $P \to (\neg R \vee S)$ | $A \to (\neg A \vee B)$ | $A \to B$ |
| $P \wedge (Q \to S)$ | $A \wedge (B \to B)$ | A |

In order to prove S, the provability can be estimated by translating S to B and checking whether it is provable in the compressed knowledge base. It is, and in fact S is provable in the original base. The proof for B proceeds by applying $\to$E to $A \to B$ (either premise 1 or 2) and A (premise 3). This is a plan for proving S, namely, one should attempt to apply $\to$E to premise 3 and one of the other premises. It is only a rough plan in that there are gaps remaining: $\wedge$E needs to be applied to premise 3 in order to produce the correct antecedent, and S must be derived from either $Q \vee S$ or $\neg R \neg S$. The compressed knowledge base is able to plan proofs for both S and P, both of which are provable, and is unable to plan for any of $\neg P, \neg Q, \neg R, \neg S$, none of which is provable from the given premises. It does provide a plan for proving both Q and for R, and these plans fail. This sets the current approach apart from conventional planning approaches which deterministically succeed after forming a plan—such approaches cannot be general and are less efficient, because they have not reduced the complexity of the problem. The current approach allows real problems to be solved after the planning stage is complete. Many other sets of grounding features can be considered, such as nearest symbol, combinations of symbols in particular relative positions, symbols which co-occur with the same sign, etc. In addition, when constants and predicate symbols are mapped into natural language and relevant text is available, it may be beneficial to incorporate text-based AGS semantics into the knowledge base representations.

The remaining problems are not necessarily easier than the initial problem given this particular premise set; however, obtaining the plan requires only a very small fraction of the total operations. Iterative planning on sub-problems can be performed for further simplification.

AGS can also allow for a determination of inferences which are plausible but not provable, which can be of great value because knowledge bases can never be assumed to be complete. Deriving the answer to a query can entail proving that two different constants are equal, say, in order to complete a unification step. If some information is missing from the knowledge base, then one might not be able to prove the necessary equality. However, if the two constants have very similar AGS meanings, one may consider the equality to be plausible enough to permit the unification and allow the search to continue. The amount of freedom (i.e., how close to each other the constants need to be, etc.) can be set in advance by the user, and when the answer is returned it can be accompanied by a list of the unproven conjectures used to derive the conclusion. The user can inspect this list and add entries to the knowledge base if appropriate. The same approach can be applied to predicate or propositional variables. If one is required to prove S(a) and can only manage to prove Q(a) for Q very similar to S, again one can allow the inference and report it (if desired) to the user. Allowing these inferences expands the breadth of reasoning in a way and can make knowledge bases much more robust against omissions and corrupt data.

Machine learning techniques are often applied to search problems (with well-known success in game playing, for example) which allow for scoring states according to how confident one is that the state will lead to a solution. Such technology can be applied to proof search so that a reasoning engine can prioritize its searches (i.e., can perform best-first search, etc.) in the most promising manner based on experience.

In order to do something other than cataloging all successes and failures, one can abstract certain features from the states and identify those combinations of features that indicate success or failure. In the field of automated reasoning, the only features that a state has are the available formulas for inferring the desired conclusion. When the language symbols are meaningless, there is little room for abstraction.

In the context of knowledge bases, learning can occur from many proofs within a fixed theory, so many of the specific constants may be meaningful for guiding search. When the knowledge bases are large, taking occurrences of particular symbols to be features presents an overwhelming feature space which may be statistically sparse.

Figure 7:
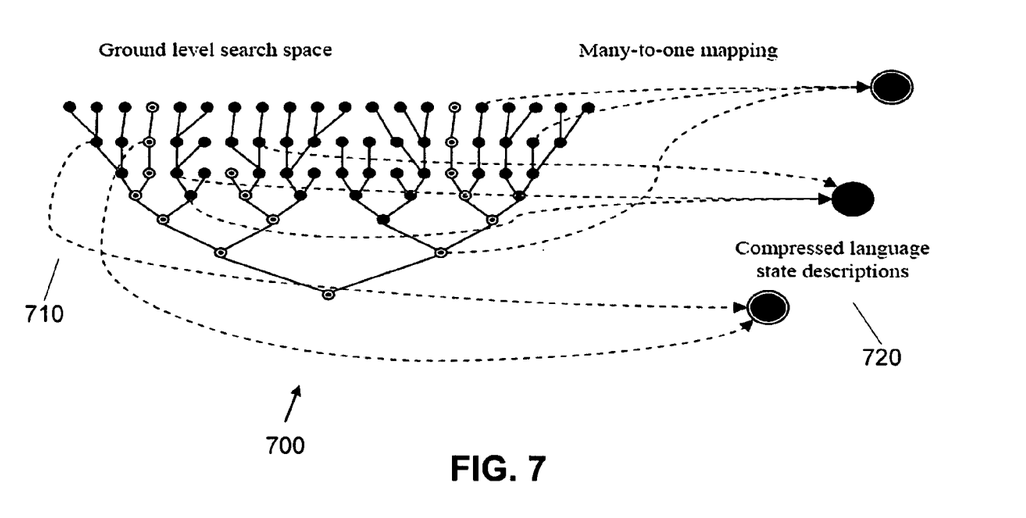
FIG. 7 is a diagram illustrating a collapse of search states through association-grounded semantics.

With reference to the diagram 700 of FIG. 7, on the left 710 a complete search for a particular conclusion (at the root) is illustrated. Learning requires statistics on the features of the failed and successful states. The states on the left 720 do not have interesting (general) features, so learning is limited. Each state can be mapped to its compressed language representation. The resulting features are general, permitting learning to take place.

AGS, by collapsing formulas, allows for more general classes of formulas to form features over which to do learning. This is illustrated in FIG. 7, where many states of the detail-level search space on the left 720 map to a single state under the AGS collapse. This type of state collapse is crucial in order for learning to be properly applied to states that have not arisen during training.

In addition to using the knowledge base assertions as features of states of the search space, one can consider formula occurrences in the search space as grounding features for the symbols of the knowledge base. That is, the AGS assignments for the symbols contain information about the contexts of their occurrences in proofs as well as in the knowledge base assertions. This is especially appealing in a natural deduction setting, where the meanings of the logical symbols themselves are essentially taken to be their use in proof.

Figure 8:
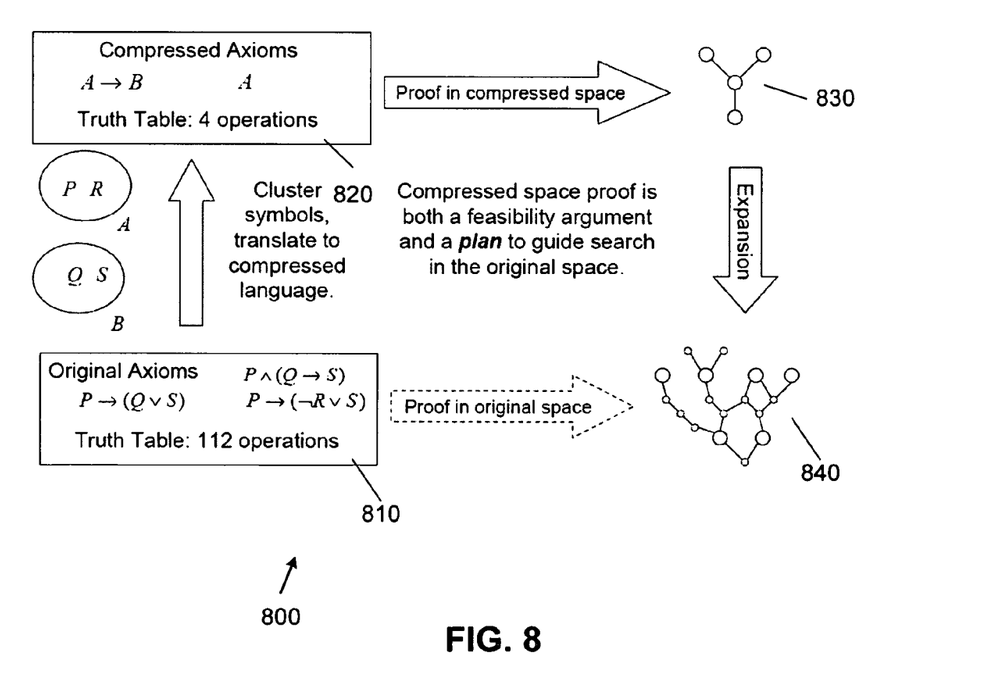
FIG. 8 is a diagram illustrating a relationship between a proof in a compressed space and a proof in an original space.

FIG. 8 is a diagram 800 that illustrates a relationship between an original proof and a compressed proof, in which, in a first uncompressed state 810, there are a plurality of axioms which are defined by a truth table having 112 operations. By clustering symbols to enable translation to a compressed language, a second state 820 may be exploited in which there are few axioms so that a corresponding truth table only has 4 operations. Such an arrangement allows a proof to be conducted in a compressed space 830. This compressed space proof can be used a feasibility argument to determine whether the knowledge base contains the queried knowledge and/or to provide a plan to conduct a search in the original space 840.

Proof theoretic learning can also enable state features to include features from the broader search space in which it sits. Redundancies found in the space may indicate ways to further prune for more efficient search. For instance, suppose every space containing a proof in which a conjunction is the conclusion of an indirect argument (i.e., by deriving a contradiction) also contains a proof in which this same conjunction is derived directly (not involving a contradiction at the final inference). Eliminating this redundancy can lead to more efficient search by providing fewer branches for deriving a conjunction. This particular property does hold in general (see, for example, Byrnes, Byrnes (1999). *Proof Search and Normal Forms in Natural Deduction*. PhD thesis, Carnegie Mellon University, the contents of which are hereby fully incorporated by reference), but is not always taken advantage of in reasoning engines.

Self-generated training data require a large number of searches in a knowledge base for training. This can be accomplished in an initialization stage by choosing goals to reason toward, and can be repeated as the knowledge base grows. Because the searches will occur offline, one can intentionally explore multiple proofs and follow up on paths that fail to lead to proofs. Large amounts of both positive and negative training data will thus be generated automatically.

In some implementations, it can be important that the queries searched are representative of the queries likely to occur during use. If the knowledge base has been used in the past, a number of queries may be available as examples. If not, the users who are entering knowledge may choose to seed the initialization stage with some difficult queries that are expected to be answerable. Another source of queries on which to train comes from the assertions of the knowledge base: attempt to derive contradictions using any formulas which appear both positively and negatively in the knowledge base. Not only are such searches likely to be difficult, but they will perform the important task of identifying known inconsistencies. The inconsistencies can be banned from use during indirect argumentation, allowing for a fuller class of queries to be addressed without allowing inconsistencies to cause the entire knowledge base to become vacuous.

The AGS meanings for the symbols can also be used to generate queries which are likely to be true and which should be informative for future inference. In the unary predicate example above, one can look for formulas of the form $P_j(a_i)$ which are not explicit in the knowledge base but which score high as likely to hold. Similarly, for predicates P(x) and Q(x) which are deemed to be similar, one can attempt to prove formulas such as $(\forall x)(P(x) \rightarrow Q(x))$, $(\forall x)(Q(x) \rightarrow P(x))$, and $(\exists x)(Q(x) \wedge P(X))$.

The study of the patterns in the overall search space allows for logical pruning, narrowing the size of the search space tremendously. The techniques that characterize states according to their success or failure in search improve the heuristics that guide the search effectively through this smaller space. Combined, search will be highly efficient even relative to the size of problem.

Figure 9:
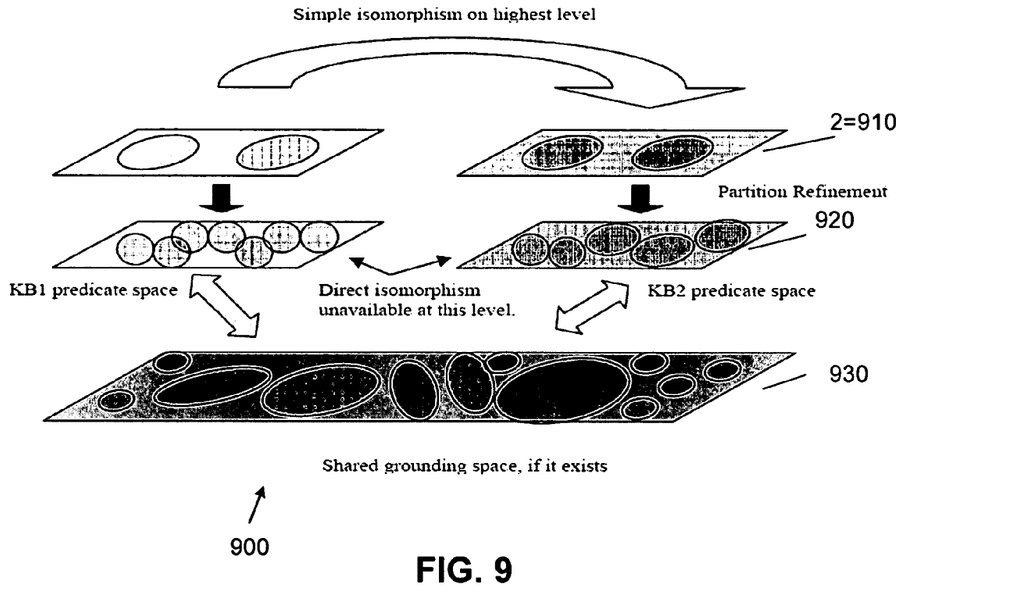
FIG. 9 is a diagram illustrating a merging of two knowledge bases.

As illustrated in diagram 900 of FIG. 9, when separate knowledge bases are merged, a mapping is required between the languages used by the two knowledge bases. Suppose that a knowledge base about various companies and people contains a predicate called "employed_by(person, company)" which enumerates the employers of many of the people in the knowledge base, and suppose that one wishes to merge this base with a knowledge base that contains assertions of the form "works_for(person, company)". Redundancies of this form will be discovered automatically, because the AGS meanings of "employed_by" and "works_for" will be very similar, if there is some reasonable amount of overlap between sets of companies and people in the two knowledge bases. Had the second knowledge base contained the predicate "employs(company, person)" instead (reversing the order of the arguments) one can still apply information-geometric techniques to the AGS meanings of the predicates in order to detect the redundancies.

AGS merging can be applied even when the constants appearing in the "employed_by" relation and the "works_for" or "employs" relation contain little or no overlap, as long as the constants appearing there appear as arguments to other predicates across the two knowledge bases. The reason for this is that predicates will be considered similar when the hold for similar constants. Constants are considered similar when they appear in similar predicates. Co-clustering, by preserving a maximal amount of mutual information, is capable of generating such a similarity measure.

Merging can be accomplished even when there is no agreement between the two knowledge bases on predicate symbols, as long as there is agreement on constant names and there is statistically significant usage of the constants in both knowledge bases. In this situation, a "shared grounding space" (see the grounding space 930 in FIG. 9) exists between the two knowledge bases.

Now consider the case in which two knowledge bases have completely disjoint languages, but one language is a direct translation of the other. One possible approach to learning the translation is to search for an isomorphism between the graphs which represent the assertions of the knowledge bases. This can be a difficult problem to address that is exacerbated when "approximate" isomorphisms are required in order to handle different cardinalities of constants. Such problems are infeasible for large knowledge bases, but AGS can be applied in multiple ways to simplify the problem.

With reference to FIG. 9, a diagram 900 illustrates an arrangement in which automatic translation between knowledge bases is illustrated. Similar classes of predicates 920 can be identified across knowledge bases KB1 and KB2 by the underlying constants, if these are shared, or else by the isomorphic structure of the coarser languages, even the ground languages are not actually isomorphic.

The first simplification is the immediate scale reduction brought by the AGS-collapsed language. If both knowledge bases are rewritten in their coarser languages 910, then the isomorphism problem becomes much smaller. Moreover, the isomorphism problem is simpler because AGS can provide smoothing. If one of the knowledge bases contains finer distinctions than the other, there may be a large set of predicates in one which maps to a small set of predicates in the other, but no direct one-to-one mapping may be available. The graphs are not isomorphic in this case, so traditional graph-isomorphism approaches need to be generalized. In the AGS-collapsed languages, however, we will still achieve a single class of predicates 920 in each language, and these classes can be mapped to each other directly. This is represented by the top-most partitions 910 in FIG. 9.

More finely-grained associations between the knowledge bases can be obtained by examining the information-geometric relations between the AGS meanings for individual symbols in the two knowledge bases. Multiple semantic assignments are available within each knowledge base (by choosing different sets of grounding features), providing multiple dimensions along which to perform these comparisons. When scale prohibits comparing the individual symbols in the original languages, one can again take the iterative planning approach of building up mappings over successively finer partitions of the language.

An additional tool can be applied to merging knowledge bases that do not have a great deal of overlap. When knowledge bases contain natural language descriptions of the symbols used, one can apply text processing techniques to these descriptions, and even to manuals that contain descriptions of the symbols. Because AGS can be adapted to handle text, one can obtain an AGS meaning for each symbol in the language, simply based on its descriptions.

The subject matter described herein addresses one of the underlying problems in automated reasoning: human understanding of terms and human reasoning about terms is semantically inexact, whereas formal logical reasoning is always completely precise. The imprecise semantics used in human understanding allows humans to obtain a rough idea of where to look for the detailed information needed, a badly needed capability that automatic systems lack. It allows humans to make inferences outside of what their current knowledge formally entails, because the inexact versions of two distinct concepts coincide well enough to permit the inference. In particular, the current subject matter is advantageous in that it minimizes the number of states searched using semantic awareness, its precise and theoretically sound formalism enables modular design and optimization, planning is driven by fully automated AGS pre-processing of the knowledge base, AGS-driven plans are general for problems in the knowledge base, training data can be automatically generated and such training can be based both on successful and failed states, and/or learning is oriented toward developing problem-solving strategies that are applicable to a broad class of problems.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a tangibly embodied machine-readable medium operable to cause one or more machines to result in operations comprising:

receiving a query of a knowledge base, the knowledge base comprising a plurality of logical symbols compressed into a plurality of disjoint bins;

reasoning over the plurality of bins to determine whether the bins indicate that the knowledge base contains knowledge requested in the query; and providing an indication characterizing a likelihood whether the knowledge base contains the knowledge requested in the query.

2. An article as in claim 1, wherein the symbols are allocated to the bins by using association statistics to map the symbols to points in an information geometric space and to assign near points to the same bin.

3. An article as in claim 2, wherein the association statistics assign probability distributions for each symbol over grounding features condition on observing the symbol.

4. An article as in claim 3, wherein the probability distributions are used to map the symbols to the points in the information geometric space.

5. An article as in claim 2, wherein the reasoning comprises:

generating a candidate response to the query; and searching symbols within the information geometric space in a ranking based on proximate distance from a point in the information geometric space corresponding to the candidate response.

6. An article as in claim 2, wherein the query includes multiple sub-queries, and wherein the reasoning comprises:

generating a candidate response for each sub-query;

determining a degree of clustering of symbols associated with each sub-query; and searching symbols within the information geometric space for the sub-query having the highest degree of clustering of symbols prior to searching symbols within the information geometric space for the other sub-queries.

7. An article as in claim 2, wherein the association statistics comprise Kullback-Leibler divergence measures.

8. An article as in claim 2, wherein the association statistics comprise Hellinger divergence measures.

9. An article as in claim 1, wherein reasoning comprises substituting variables in the query with variables associated with the plurality of bins.

10. An article as in claim 1, wherein the article is further operable to cause one or more machines to result in operations comprising:

reasoning over at least a portion of the symbols if it is determined that the bins indicate that the knowledge base contains knowledge requested in the query.

11. An article as in claim 10, wherein the reasoning over at least a portion of the symbols reasons over those bins in which it is indicated that the knowledge base contains knowledge requested in the query.

12. An article as in claim 10, wherein the portion of the symbols reasoned over are specified by a plan.

13. An article comp rising a tangibly embodied machine-readable medium operable to cause one or more machines to result in operations comprising:

receiving a query of a knowledge base characterized by an association-grounded semantics collapsed language;

determining whether there is an indication that the knowledge base contains knowledge requested in the query; and providing an indication characterizing a likelihood whether the knowledge base contains the knowledge requested in the query.

14. An article for merging two or more knowledge bases comprising a tangibly embodied machine-readable medium operable to cause one or more machines to result in operations comprising:

applying association-grounded semantics to collapse a language of each of the knowledge bases to obtain a single class of predicates for each language; and mapping the classes of predicates for the knowledge bases into a common language to generate a merged knowledge base.

15. An article as in claim 14, wherein the knowledge bases comprise a shared grounding space having a number of common constants above a predetermined statistical threshold.

16. An article as in claim 14, wherein at least two of the languages are disjoint and wherein the mapping further comprises:

identifying an isomorphism between graphs of the knowledge bases that represent assertions of the knowledge bases.

17. An article as in claim 14, wherein the mapping comprises: iteratively partitioning the knowledge bases into finer partitions using association-grounded semantics until a predetermined scale is obtained.

18. An article as in claim 14, wherein the applying further comprises: identifying similar classes of predicates in each of the knowledge bases.

19. An article as in claim 14, wherein at least one of the knowledge bases includes natural language descriptions of its utilized symbols, and wherein the article is further operable to cause one or more machines to result in operations comprising:

applying text processing to obtain association-grounded semantic meanings for each of the utilized symbols.

20. A method comprising:

receiving a knowledge base including a plurality of logical symbols arranged in formulas;

assigning a probability distribution to the symbols;

placing symbols into bins based on a similarity of the assigned probability distributions; and providing access to a compressed knowledge base in which the bins are used as a reduced set of symbols to enable one or more queries to be performed against the knowledge base.

* * * * *